United States Patent
Yu et al.

(10) Patent No.: US 10,292,139 B2
(45) Date of Patent: May 14, 2019

(54) METHOD AND APPARATUS FOR BEAMFORMING

(71) Applicant: Samsung Electronics Co., Ltd, Gyeonggi-do (KR)

(72) Inventors: Hyun-Kyu Yu, Yongin-si (KR); Jeong-Ho Park, Seoul (KR); Ji-Yun Seol, Gyeonggi-do (KR); Su-Ryong Jeong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 704 days.

(21) Appl. No.: 13/933,000

(22) Filed: Jul. 1, 2013

(65) Prior Publication Data
US 2014/0004898 A1    Jan. 2, 2014

(30) Foreign Application Priority Data

Jun. 29, 2012 (KR) .................. 10-2012-0071138

(51) Int. Cl.
*H04W 72/00* (2009.01)
*H04W 72/04* (2009.01)
*H04W 72/12* (2009.01)
*H04B 7/0408* (2017.01)

(52) U.S. Cl.
CPC ...... *H04W 72/0413* (2013.01); *H04B 7/0408* (2013.01); *H04W 72/1284* (2013.01); *H04W 72/046* (2013.01)

(58) Field of Classification Search
CPC ............. H04W 72/04; H04W 72/0413; H04W 72/046; H04W 72/1284; H04W 72/042; H04W 16/28; H04W 48/12; H04W 48/20; H04W 72/0453; H04B 7/0408; H04B 7/0632; H04B 7/0452; H04B 7/0417; H04B 7/0634; H04B 7/0695; H04B 7/088
See application file for complete search history.

(56) References Cited

U.S. PATENT DOCUMENTS

| | | | |
|---|---|---|---|
| 8,208,427 B2 * | 6/2012 | Taghavi Nasrabadi | ..................... H04B 7/0634 370/328 |
| 9,585,083 B2 * | 2/2017 | Li | ......................... H04W 48/12 |
| 9,750,003 B2 * | 8/2017 | Yu | ....................... H04W 72/042 |

(Continued)

FOREIGN PATENT DOCUMENTS

| | | |
|---|---|---|
| WO | WO 2008/069415 | 6/2008 |
| WO | WO 2011/068358 A2 | 6/2011 |
| WO | WO-2018177230 A1 * | 10/2018 |

OTHER PUBLICATIONS

Written Opinion of the International Searching Authority dated Oct. 21, 2013 in connection with International Patent Application No. PCT/KR2013/005799.

(Continued)

*Primary Examiner* — Matthew C Sams

(57) ABSTRACT

A method and an apparatus using beamforming in a wireless communication system are provided. The communication method includes detecting generation of uplink data to be transmitted from a Mobile Station (MS) to a Base Station (BS), and transmitting a scheduling request signal requesting uplink resource allocation in at least one channel region corresponding to uplink transmission and reception beams in an uplink resource area allocated to a scheduling request channel.

10 Claims, 10 Drawing Sheets

(56) References Cited

U.S. PATENT DOCUMENTS

| | | | |
|---|---|---|---|
| 9,854,596 B2* | 12/2017 | Calcev | H04W 72/1231 |
| 2005/0164664 A1* | 7/2005 | DiFonzo | H04L 45/00 |
| | | | 455/277.1 |
| 2005/0221861 A1 | 10/2005 | Zeira | |
| 2009/0160707 A1* | 6/2009 | Lakkis | H04B 7/0417 |
| | | | 342/367 |
| 2010/0067467 A1 | 3/2010 | Cho et al. | |
| 2010/0195527 A1* | 8/2010 | Gorokhov | H04B 7/0417 |
| | | | 370/252 |
| 2010/0226290 A1 | 9/2010 | Kwak et al. | |
| 2011/0007721 A1* | 1/2011 | Taghavi Nasrabadi | |
| | | | H04W 72/046 |
| | | | 370/338 |
| 2011/0222499 A1* | 9/2011 | Park | H04W 72/0413 |
| | | | 370/329 |
| 2012/0014343 A1 | 1/2012 | Womack et al. | |
| 2012/0236816 A1 | 9/2012 | Park et al. | |
| 2012/0320874 A1* | 12/2012 | Li | H04W 48/12 |
| | | | 370/331 |
| 2013/0182683 A1* | 7/2013 | Seol | H04W 72/046 |
| | | | 370/335 |
| 2013/0201938 A1* | 8/2013 | Seol | H04W 72/1284 |
| | | | 370/329 |
| 2013/0215844 A1* | 8/2013 | Seol | H04W 72/046 |
| | | | 370/329 |
| 2013/0223251 A1* | 8/2013 | Li | H04W 72/046 |
| | | | 370/252 |
| 2014/0004898 A1* | 1/2014 | Yu | H04W 72/0413 |
| | | | 455/510 |
| 2014/0177561 A1* | 6/2014 | Yu | H04W 72/042 |
| | | | 370/329 |
| 2017/0034812 A1* | 2/2017 | Deng | H04W 72/046 |
| 2017/0311301 A1* | 10/2017 | Yu | H04B 7/0617 |

OTHER PUBLICATIONS

International Search Report dated Oct. 21, 2013 in connection with International Patent Application No. PCT/KR2013/005799.
"Scheduling Request Channel in E-UTRA Uplink", 3GPP TSG RAN WG1 Meeting #51bis, Jan. 14-18, 2008, 2 pages.
Extended European Search Report issued for EP 13809230.9 dated Jan. 22, 2016, 8 pgs.

* cited by examiner

METHOD AND APPARATUS FOR BEAMFORMING

CROSS-REFERENCE TO RELATED APPLICATION(S) AND CLAIM OF PRIORITY

The present application is related to and claims the benefit under 35 U.S.C. § 119(a) of a Korean patent application No. 10-2012-0071138 filed on Jun. 29, 2012 in the Korean Intellectual Property Office, the entire disclosure of which is hereby incorporated by reference.

TECHNICAL FIELD

The present invention relates to signal transmission and reception in a communication system. More particularly, the present invention relates to a method and apparatus of transmitting an UpLink (UL) contention-based access channel in a wireless communication system using beamforming.

BACKGROUND

To satisfy ever-increasing demands for wireless data traffic, wireless communication systems have been developed toward higher data rates. Previously, efforts were expended on increasing spectral efficiency in order to increase data rates. However, as demands for traffic have been accelerated due to increased demands for smartphones and tablet Personal Computers (PCs) and the resulting rapid growth of application programs requiring a large amount of traffic, it is difficult to satisfy the soaring demands for wireless data traffic simply by increasing spectral efficiency.

One approach to averting the problem is to use a very broad frequency band. Because it is difficult to secure a broad frequency band in the frequency band below 10 GHz used for legacy cellular mobile communication systems, the broadband frequency should be obtained from a higher frequency band. However, as wireless communication is conducted in a higher transmission frequency, propagation path loss is increased. The resulting shortened propagation distance reduces service coverage. One of significant techniques to mitigate path loss and increase the propagation distance of waves is beamforming.

There are two types of beamforming, transmission beamforming at a transmitter and reception beamforming at a receiver. Transmission beamforming increases directivity by focusing signals transmitted from a plurality of antennas toward a specific direction (i.e. space). A set of plural antennas is called an array antenna and each antenna included in the array antenna is called an antenna element or an array element. Various antenna arrays are available, including a linear array and a planar array. Owing to its advantages of increased directivity and almost non-transmission of a signal in directions other than a specific direction, the transmission beamforming reduces interference with other users significantly.

Reception beamforming is available on the part of a receiver using a reception array antenna. The reception beamforming focuses wave reception toward a specific direction, thereby increasing the reception sensitivity of a signal from the specific direction and excluding signals from other directions. Therefore, interference signals are blocked.

To secure a broad frequency band, an extremely high frequency system, namely a millimeter wave system has been introduced. The wavelength of a signal wave gets shorter in a higher transmission frequency. If antennas are configured at half-wavelength intervals, more antennas may be arranged in the same area in an array antenna. That is, beamforming is favorable to a millimeter wave communication system because high-frequency beamforming can produce a higher antenna gain than low-frequency beamforming.

Beamforming basically requires a beam selection technique in which a Base Station (BS) and a Mobile Station (MS) accurately measure transmission and reception beams and report best beams. However, when the MS transmits a UL contention-based access channel to the BS, the beam selection process may already be completed or should be performed again under circumstances. Accordingly, there exists a need for a procedure of transmitting and receiving a UL access channel and a channel structure, which can support such cases.

The above information is presented as background information only to assist with an understanding of the present disclosure. No determination has been made, and no assertion is made, as to whether any of the above might be applicable as prior art with regard to the present invention.

SUMMARY

To address the above-discussed deficiencies of the prior art, it is a primary object to provide a method and apparatus of transmitting and receiving information in a communication system.

Another aspect of the present invention is to provide a method and apparatus of transmitting and receiving an Uplink (UL) contention-based access channel in a wireless communication system using beamforming.

Another aspect of the present invention is to provide a method and apparatus of transmitting and receiving a UL scheduling request channel in a wireless communication system using beamforming.

Another aspect of the present invention is to provide a method and apparatus of performing a UL scheduling request procedure irrespective of whether beam selection has already been performed in a wireless communication system using beamforming.

In accordance with an aspect of the present invention, a communication method using beamforming in a wireless communication system is provided. The communication method includes detecting generation of uplink data to be transmitted from a Mobile Station (MS) to a Base Station (BS), and transmitting a scheduling request signal requesting uplink resource allocation in at least one channel region corresponding to uplink transmission and reception beams in an uplink resource area allocated to a scheduling request channel.

In accordance with another aspect of the present invention, an MS apparatus of performing communication using beamforming in a wireless communication system is provided. The MS apparatus includes a controller configured to detect generation of uplink data to be transmitted to a BS, and a transmitter configured to transmit a scheduling request signal requesting uplink resource allocation in at least one channel region corresponding to uplink transmission and reception beams in an uplink resource area allocated to a scheduling request channel.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components, and structures.

DETAILED DESCRIPTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication technologies. The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention will be provided to achieve the above-described technical aspects of the present invention. In an exemplary implementation, defined entities may have the same names, to which the present invention is not limited. Thus, exemplary embodiments of the present invention can be implemented with same or ready modifications in a system having a similar technical background.

A beamforming-based millimeter wave wireless communication system needs beamforming in order to maximize a beam gain on Uplink (UL) and Downlink (DL) and thus overcome large propagation loss and penetration loss inherent to the channel propagation nature of a millimeter wave band.

Figure 1:
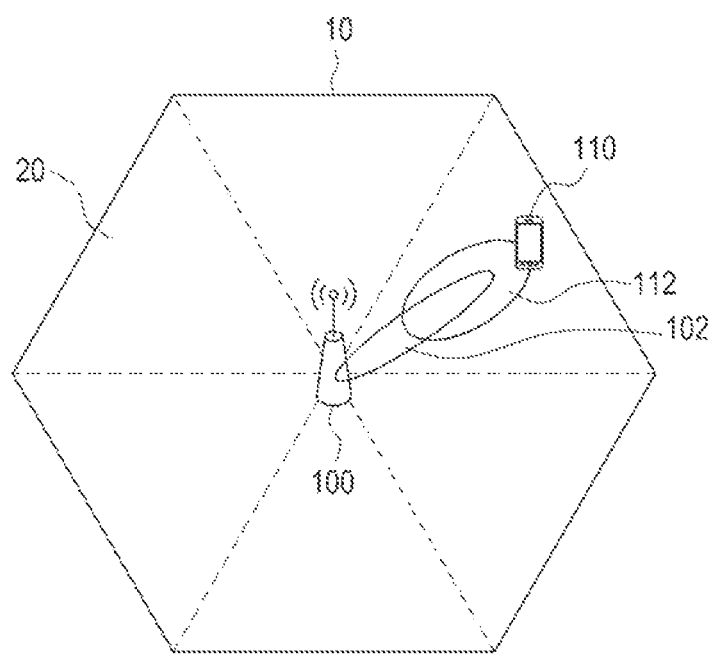
FIG. 1 illustrates a scenario of transmitting and receiving a signal by beamforming according to an exemplary embodiment of the present invention.

FIG. 1 illustrates a scenario of transmitting and receiving a signal by beamforming according to an exemplary embodiment of the present invention.

Referring to FIG. 1, a Base Station (BS) 100 can cover a service area corresponding to a cell 10 including a plurality of sectors 20. The cell 10 can include one or more sectors 20 and the BS 100 can use multiple beams in each sector 20. To support one or more Mobile Stations (MSs), acquiring a beamforming gain, the BS 100 forms one or more Transmission/Reception (Tx/Rx) beams on DL/UL by sweeping the Tx/Rx beams in different directions simultaneously or sequentially.

For example, the BS 100 simultaneously forms N Rx beams steered in N directions across N slots. In another example, the BS 100 sequentially forms N Rx beams by sweeping the N Rx beams in N directions across N slots. Specifically, a first Rx beam is formed only in a first slot, a second Rx beam is formed only in a second slot, an $i^{th}$ Rx beam is formed only in an $i^{th}$ slot, and an $N^{th}$ Rx beam is formed only in an $N^{th}$ slot.

Due to its structural limitations, an MS 110 can be configured so as to use a wide beamwidth supporting a small beam gain, compared to the BS 100. The MS 110 can support one or more Rx/Tx beams on DL/UL according to the configuration of the MS 110.

UL beamforming is performed based on a combination of MS Tx beamforming and BS Rx beamforming. UL beamforming involves a UL beam tracking procedure in which a best beam pair is selected from among one or more MS Tx beams and one or more BS Rx beams steered in different directions and an MS and a BS share information about the best beam pair. For the UL beam tracking, a preset UL Reference Signal (RS) can be used.

Figure 2:
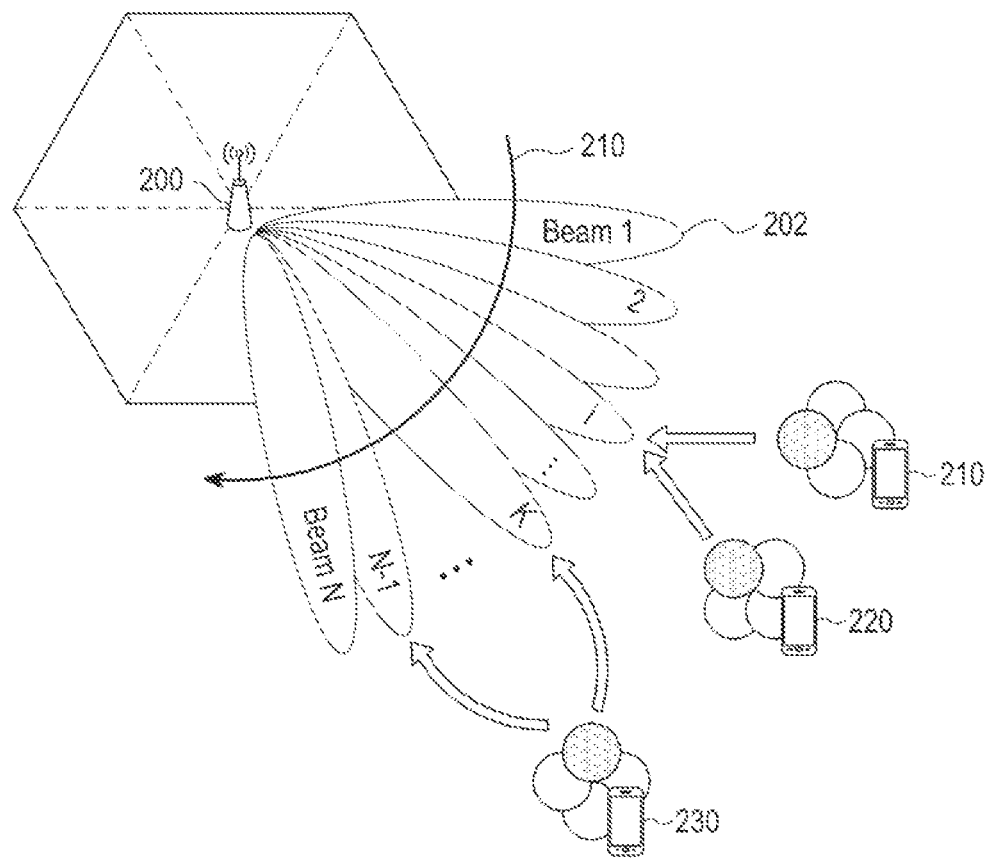
FIG. 2 illustrates beamforming-based communication between a Base Station (BS) and Mobile Stations (MSs) according to an exemplary embodiment of the present invention.

FIG. 2 illustrates beamforming-based communication between a BS and MSs according to an exemplary embodiment of the present invention. In the illustrated case of FIG. 2, a BS 200 uses a plurality of Rx beams 202 steered in different directions on UL in each sector and each of MSs 210, 220 and 230 supports one or more Tx beams.

Referring to FIG. 2, the BS 200 can receive a plurality of beamformed signals (i.e. Rx beams) simultaneously from different directions, or can receive a plurality of signals in one or more Rx beams by sweeping the Rx beams in different directions sequentially in time as indicated by reference numeral 210.

The MSs 210, 220 and 230 can support omni-directional transmission without supporting Tx beamforming, can apply one specific beamforming pattern at one time, supporting Tx beamforming, or can apply a plurality of Tx beamforming patterns simultaneously in different directions, supporting Tx beamforming, depending on the configurations of the MSs 210, 220, and 230 designed to maximize a beamforming gain under constraints imposed on the shapes and complexity of the MSs 210, 220 and 230.

For an MS (not shown) that does not support Tx beamforming, the BS 200 measures the channel quality of a UL RS in each Tx beam and selects a best Rx beam for the MS from among a plurality of Rx beams based on the measurements. For the MSs 210, 220 and 230 supporting Tx beamforming, the BS 200 measures the channel quality of every possible Tx-Rx beam pair regarding each Tx beamforming pattern of the MSs 210, 220 and 230, selects one or more best Tx-Rx beam pairs or all Tx-Rx beam pairs based on the channel quality measurements, and schedules appropriate beams pairs for the MSs 210, 220 and 230 under circumstances.

In a multiple access situation where the MSs 210, 220 and 230 access the BS 200, the MSs 210, 220 and 230 can use, for example, a UL Ranging (UL RNG) channel or a Random Access Channel (RACH) to transmit a signal requesting resource allocation to the BS 200.

When an MS transmits an access signal to a BS on a contention-based access channel, the MS can use a resource region corresponding to a best UL Tx/Rx beam depending on whether a UL beam tracking procedure has been performed or not. For example, the contention-based access channel is a scheduling request channel. Specifically, in the presence of UL transmission data, the MS can request resources needed to transmit the UL data to the BS on the access channel. For this purpose, the MS transmits a scheduling request to the BS in a contention-based or contention-free manner. Because the MS can transmit the contention-based scheduling request channel freely, the contention-based scheduling request channel can be transmitted before or after the UL beam tracking (i.e. UL beam selection) procedure. Therefore, a resource region to carry the scheduling request channel should be determined depending on whether the UL beam tracking procedure has been performed or not.

While exemplary embodiments of the present invention will be described below in the context of a scheduling request channel, it should be clearly understood that the same thing applies to UL contention-based access channels.

When requesting scheduling, an MS can consider the following three situations regarding acquisition of UL beam information.

First of all, the MS does not have knowledge of a best UL beam(s). That is, the MS does not have UL beam information for use in requesting scheduling irrespective of whether a UL beam selection procedure has already been performed.

Secondly, the MS has knowledge of a best UL Tx beam(s). This means that the MS has received information about the best UL Tx beam(s) from the BS by a UL beam selection procedure and thus the MS can use the best Tx beam in requesting scheduling.

Finally, the MS has knowledge of best UL Tx and Rx beams. This means that the MS has received information about the best UL Tx and Rx beams from the BS by a UL beam selection procedure and thus the MS can use the best Tx and Rx beams in requesting scheduling.

A decision can be made as to whether the MS can use the best UL Tx/Rx beam in requesting scheduling, according to whether the MS performs UL beam selection periodically and a beam change estimated based on the time difference between the last UL beam selection and a current scheduling request.

Figure 3:
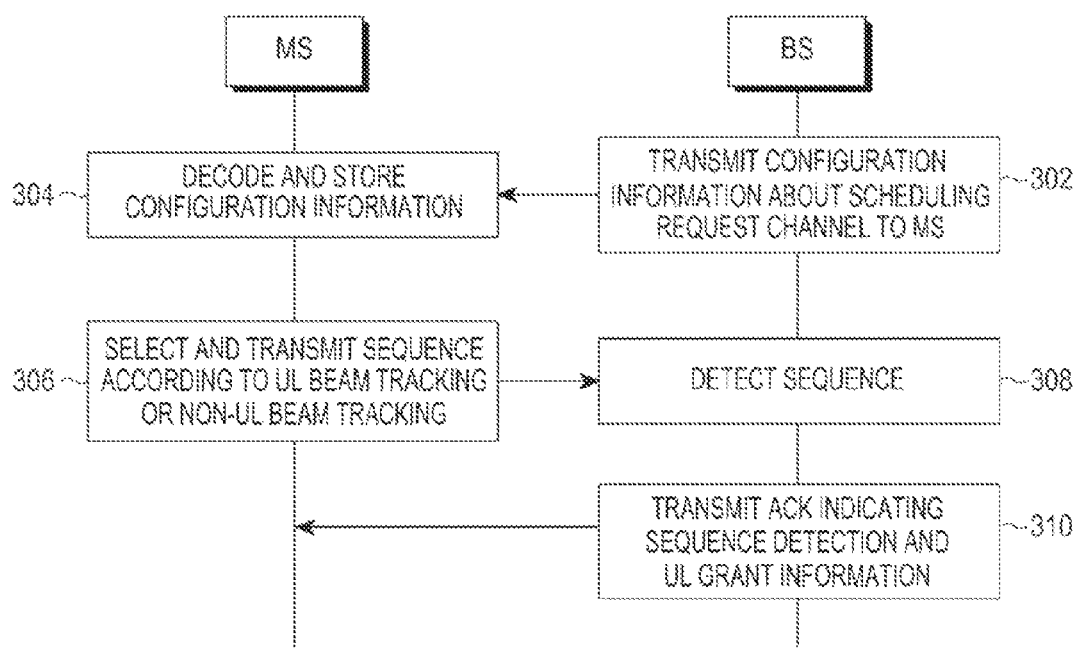
FIG. 3 is a flowchart illustrating a scheduling request procedure according to an exemplary embodiment of the present invention.

FIG. 3 is a flowchart illustrating a scheduling request procedure according to an exemplary embodiment of the present invention. The scheduling request procedure supports all of the above-described three cases.

Referring to FIG. 3, a BS broadcasts configuration information to MSs within a cell so that the MSs can transmit a scheduling request for UL data transmission in step 302. For example, the scheduling request can include a UL BandWidth (BW) request and the configuration information describes the configuration of a scheduling request channel. In step 304, an MS decodes the configuration information and stores the decoded configuration information for future use in case of UL data generation.

Upon generation of UL data, the MS selects a random scheduling request channel or a scheduling request channel allocated to a specific time according to a preset rule and transmits a signal for a scheduling request, in example, a scheduling request sequence or a Bandwidth Request (BR) sequence on the selected scheduling request channel in step 306. The signal can be a sequence selected randomly from a predetermined pool of sequences or based on an MS Identifier (ID) or a user ID.

If the BS succeeds in detecting the scheduling request signal in step 308, the BS transmits an ACKnowledgement (ACK) indicating successful detection of the scheduling request signal and UL grant information to the MS in step 310. For example, the UL grant information can include at least one of the scheduling request signal detected in step 308, information about a UL Tx beam corresponding to a resource position at which the scheduling request signal was detected, and a UL grant needed as a response to the scheduling request. The UL grant indicates, for example, allocation of resources available for UL data transmission.

The MS can perform a UL transmission procedure later, referring to the received information.

In the scheduling request procedure of FIG. 3, the scheduling request signal can be transmitted in at least one UL Tx/Rx beam. Hereinbelow, exemplary embodiments of a UL Tx/Rx beam carrying a scheduling request signal will be described.

Figure 4:
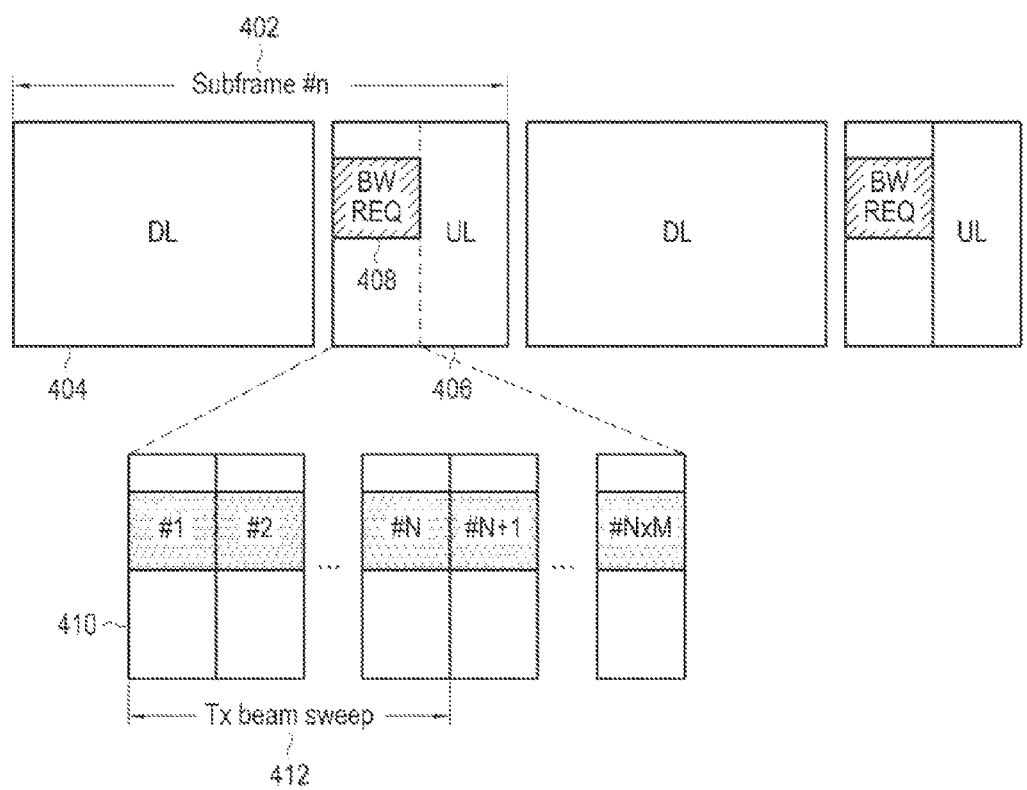
FIG. 4 illustrates the structure of a scheduling request channel according to an exemplary embodiment of the present invention.

FIG. 4 illustrates the structure of a scheduling request channel according to an exemplary embodiment of the present invention. The scheduling request channel is configured in the structure of FIG. 4 in the case where an MS transmits a scheduling request without knowledge of a best UL Tx/Rx beam, that is, without performing a UL beam selection procedure.

Referring to FIG. 4, communication is conducted in subframes 402. In Time Division Duplex (TDD), each subframe 402 is divided into a DL region 404 and a UL region 406. A predetermined time-frequency resource area 408 of each UL region 406 is allocated as a scheduling request channel.

The resource area 408 of the scheduling request channel is divided into a plurality of channel regions (i.e. a plurality of Tx opportunities) 410 mapped to MS Tx beams and BS Rx beams. Each channel region 410 is mapped to a specific one MS Tx beam and a specific BS Rx beam. N channel regions are mapped to N MS Tx beams and these N channel regions occur M times repeatedly. M is the number of BS Rx beams. Accordingly, an MS can use N Tx beams at maximum to request scheduling and a BS can use M Rx beams at maximum to receive a scheduling request. To support all Tx beams and Rx beams, the resource area 408 of the scheduling request channel can be distributed to a plurality of subframes.

Without knowledge of information about a best UL beam, the MS transmits a scheduling request signal N times sequentially in N channel regions by sweeping N Tx beams in all directions in each Rx beam region corresponding to one UL Rx beam. The scheduling request signal can occupy one channel region, for transmission. Specifically, the MS transmits the scheduling request signal by Tx beam #1 in channel region #1 and by Tx beam #n in channel region #n. The scheduling request signal can be a scheduling request sequence selected randomly or a BR sequence selected based on an MS ID or a user ID. The MS sweeps the Tx beams in every Rx beam region.

While it has been described above that the resource area 408 is divided into a plurality of Rx beam regions and all Tx beams are swept in each Rx beam region, the opposite case is also possible. In other words, the resource area 408 can be divided into a plurality of Tx beam regions and the MS can transmit a scheduling request signal M times repeatedly using a Tx transmission beam in each Tx beam region. Then the BS can attempt to receive the scheduling request signal, using M Rx beams sequentially in each Tx beam region.

The BS monitors reception of scheduling request signals from MSs within the cell by sweeping Rx beams in all directions in the resource area 408 of the scheduling request channel. Specifically, the BS monitors reception of a scheduling request signal from an MS by Rx beam #1 in the first N channel regions, monitors reception of the scheduling request from the MS by Rx beam #2 in the next N channel regions, and monitors reception of the scheduling request from the MS by Rx beam #M in the $M^{th}$ N channel regions.

The configuration of the resource area 408 of the scheduling request channel is known to the MSs within the cell by the configuration information broadcast from the BS. For example, the configuration information includes at least one of the time and frequency positions of the resource area 408 of the scheduling request channel, M and N values, available scheduling request signals (i.e. scheduling request sequences or BR sequences), and Tx and Rx parameters. The BS can further signal the number of channel regions in a scheduling request channel on which an MS will transmit a scheduling request signal. In other words, the BS commands transmission of a scheduling request signal in one or more channel regions by configuration information or other information.

The MS transmits the scheduling request signal by all Tx beams in all channel regions of the resource area 408 based on the configuration information. The BS attempts to detect the scheduling request signal from the MS using a BS Rx beam in each channel region of the resource area 408. Upon successful detection of the scheduling request signal, the BS transmits to the MS information about the detected signal, information about a UL Tx beam corresponding to a resource position at which the signal has been detected (e.g. the index or beam index of a channel region), and other information needed as a response to the scheduling request.

Figure 5:
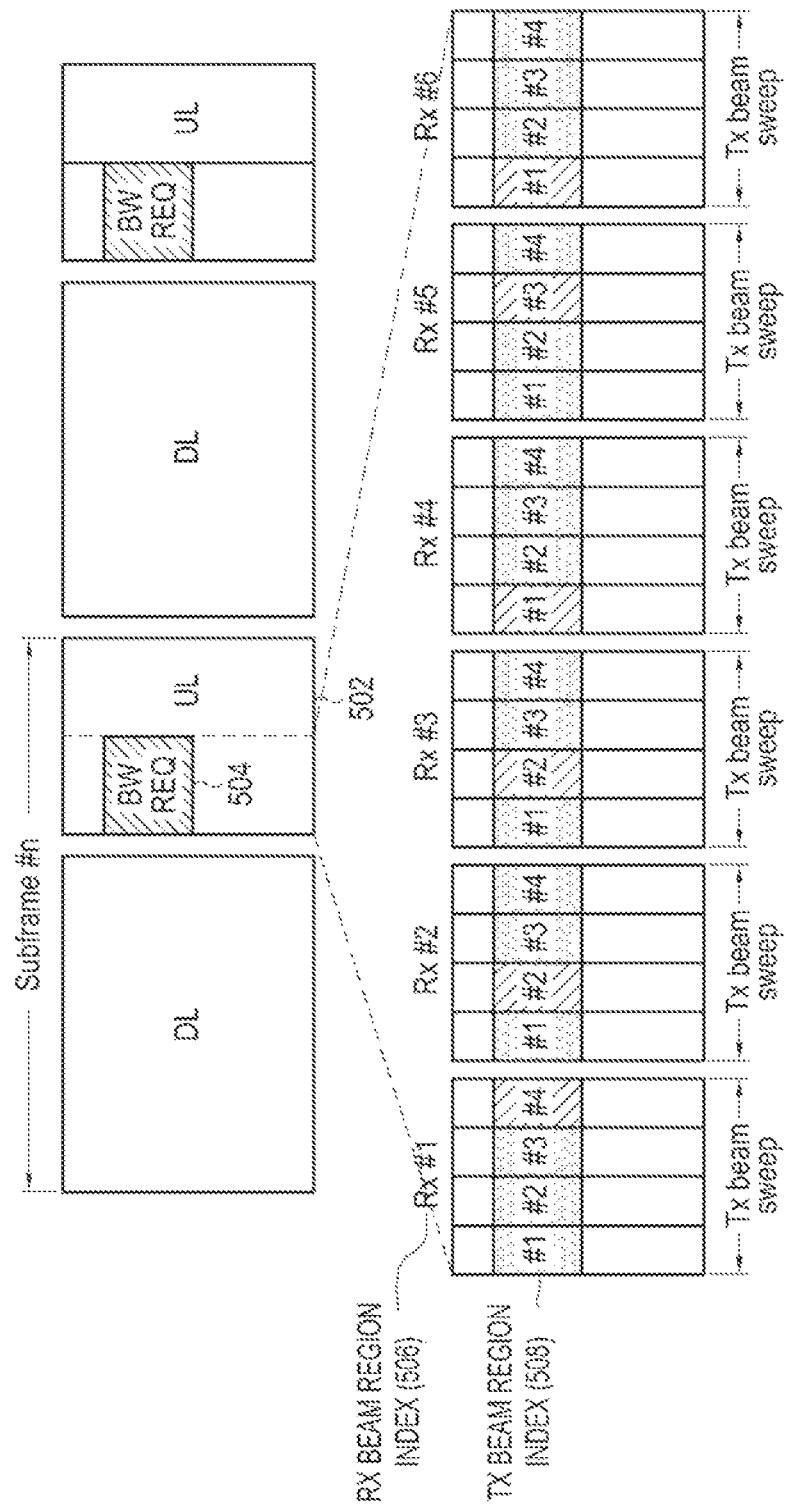
FIG. 5 illustrates the structure of a scheduling request channel according to another exemplary embodiment of the present invention.

FIG. 5 illustrates the structure of a scheduling request channel according to another exemplary embodiment of the present invention. The scheduling request channel is configured in the structure of FIG. 5 in the case where an MS has knowledge of a best UL Tx beam.

Referring to FIG. 5, the scheduling request channel has a similar configuration to the configuration illustrated in FIG. 4. The scheduling request channel is allocated to a specific resource area 504 in a UL region 502. The resource area 504 is divided into a plurality of channel regions (i.e. a plurality of Tx opportunities) mapped to MS Tx beams and BS Rx beams. N×M channel regions are mapped to N MS Tx beams and M BS Rx beams. Among the channel regions, channel regions mapped to one BS Rx beam are collectively referred to as an RX beam region. Thus, first N channel regions are a first Rx beam region and the resource area 504 includes M Rx beam regions. Each Rx beam region includes N channel regions corresponding to N Tx beams, that is, N Tx beam regions. To support all Tx beams and all Rx beams, the resource area 504 of the scheduling request channel can be distributed to a plurality of subframes.

A BS broadcasts configuration information describing the configuration of the resource area 504 of the scheduling request channel to MSs within a cell. For example, the configuration information includes at least one of the time and frequency positions of the resource area 408 of the scheduling request channel, M and N values, available scheduling request signals (i.e. scheduling request sequences or BR sequences), and Tx and Rx parameters. The BS can further signal the number of channel regions in a scheduling request channel on which an MS will transmit a scheduling request signal. In other words, the BS commands transmission of a scheduling request signal in one or more channel regions by configuration information or other information.

An MS selects a scheduling request signal randomly or based on information such as its user ID in order to request scheduling and transmits the scheduling request signal in channel regions selected from among the N×M channel regions. Because the MS knows a best UL Tx beam, the MS does not need to use all Tx beams to transmit the scheduling request signal. Therefore, the MS transmits the scheduling request signal in one or more Tx beam regions selected from among Tx regions corresponding to each Rx beam, that is, in each of Rx beam regions 506 in which the MS transmits different Tx beams regarding each Rx beam of the BS.

Specifically, the MS transmits the scheduling request signal in one or more random Tx beam regions in each Rx beam region 506. In this case, the probability of colliding between the scheduling request signal of the MS and signals transmitted from other MSs can be minimized. Even though the scheduling request signal of the MS collides with a signal of another user in one Rx beam region, the BS can receive the scheduling request signal of the MS successfully by another Rx beam in another Rx beam region.

In the example of FIG. 5, the MS transmits the scheduling request signal in a randomly selected Tx beam region #4 of Rx beam region, Rx #1, in a randomly selected Tx beam region #2 of Rx beam region Rx #2, in a randomly selected Tx beam region #2 of Rx beam region Rx #3, in a randomly selected Tx beam region #1 of Rx beam region Rx #4, in a randomly selected Tx beam region #3 of Rx beam region Rx #5, and in a randomly selected Tx beam region #1 of Rx beam region Rx #6.

In an exemplary embodiment of the present invention, the MS can transmit the scheduling request signal by the best UL Tx beam in each selected Tx beam region irrespective of a Tx beam mapped to the selected Tx beam region. For example, the MS transmits the best Tx beam #1 selected during a beam selection procedure the randomly selected Tx beam region #4 of Rx beam region Rx #1, instead of Tx beam #4 mapped to Tx beam region #4. Likewise, the MS transmits the best Tx beam #1 in the randomly selected Tx beam region #2 of Rx beam region Rx #2, instead of Tx beam #2 mapped to Tx beam region #2. The MS operates in the same manner in the subsequent Rx beam regions.

In another exemplary embodiment of the present invention, the MS can transmit the scheduling request signal in each selected Tx beam region by a UL Tx beam mapped to the Tx beam region.

The BS monitors reception of scheduling request signals from MSs within the cell by sweeping Rx beams in all directions in the resource area 504. That is, the BS attempts to detect a scheduling request signal from an MS using a BS Rx beam corresponding to each channel region of the resource area 504. Upon successful detection of the scheduling request signal, the BS transmits to the MS information about the detected signal, information about a UL Tx beam corresponding to a resource position at which the signal has been detected (e.g. the index or beam index of a channel region), and other information needed as a response to the scheduling request.

In a modified embodiment of the present invention, the resource area 504 is divided into a plurality of Tx beam regions, each including a plurality of contiguous Rx beam regions. An MS can transmit a scheduling request signal M times repeatedly in at least one Tx beam region randomly selected from among the plurality of Tx beam regions by a Tx beam corresponding to the at least one Tx beam region. The BS may attempt to receive the scheduling request signal by sequentially using M Rx beams in each Tx beam region.

Figure 6:
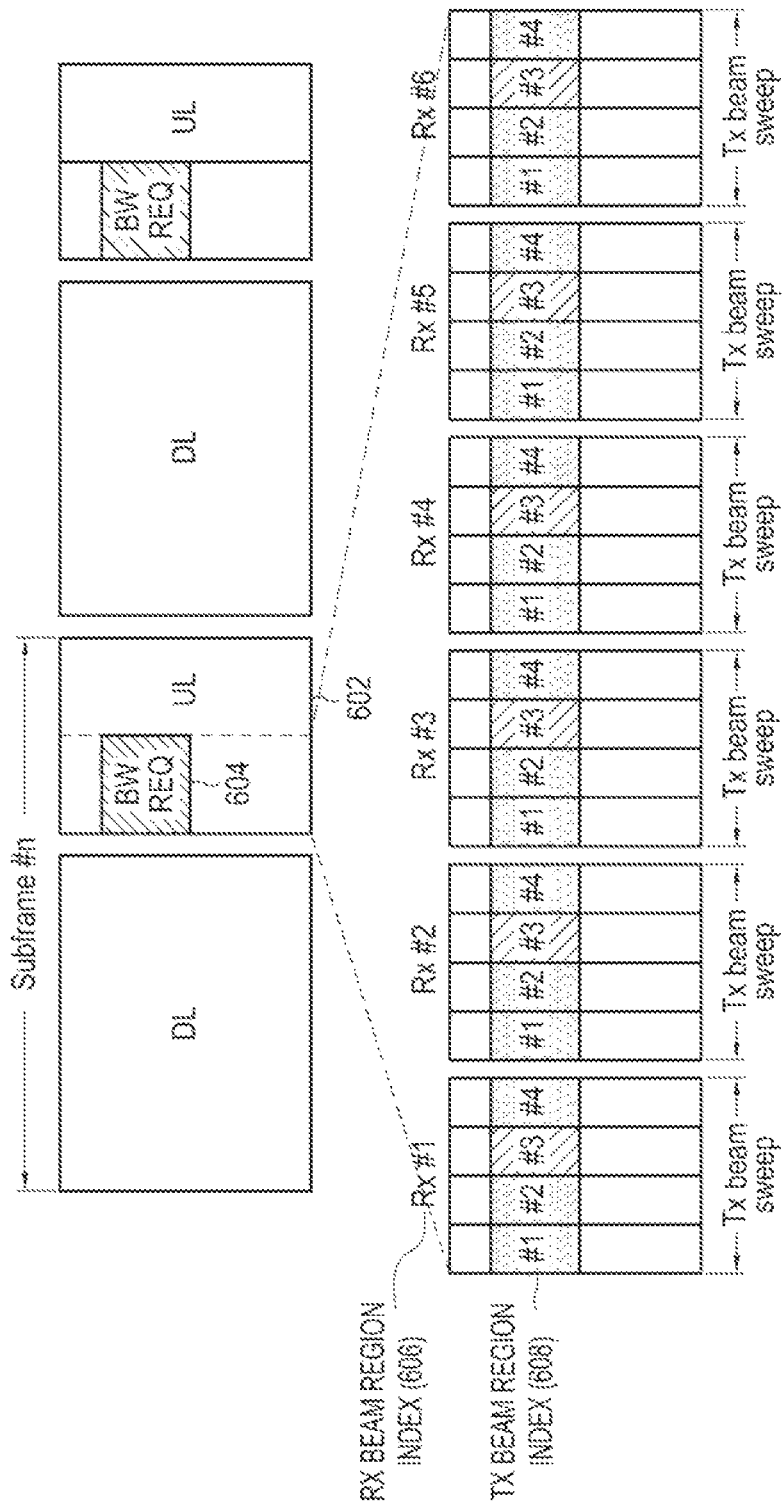
FIG. 6 illustrates the structure of a scheduling request channel according to another exemplary embodiment of the present invention.

FIG. 6 illustrates the structure of a scheduling request channel according to another exemplary embodiment of the present invention. The scheduling request channel has another exemplary configuration for the case where an MS has knowledge of a best UL Tx beam.

Referring to FIG. 6, the scheduling request channel has a configuration similar to the configurations illustrated in FIGS. 4 and 5. The scheduling request channel is allocated to a specific resource area 604 in a UL region 602. The resource area 604 is divided into a plurality of channel regions (i.e. a plurality of Tx opportunities) mapped to MS Tx beams and BS Rx beams. N×M channel regions are mapped to N MS Tx beams and M BS Rx beams. Among the channel regions, channel regions mapped to one BS Rx beam are collectively referred to as an Rx beam region. Thus, first N channel regions are a first Rx beam region and the resource area 604 includes M Rx beam regions. Each Rx beam region includes N channel regions corresponding to N Tx beams, that is, N Tx beam regions.

A BS broadcasts configuration information describing the configuration of the resource area 604 of the scheduling request channel to MSs within a cell. For example, the configuration information includes at least one of the time and frequency positions of the resource area 604 of the scheduling request channel, M and N values, available scheduling request signals (i.e. scheduling request signals or BR sequences), and Tx and Rx parameters. The BS can further signal the number of channel regions in a scheduling request channel on which an MS will transmit a scheduling request signal. In other words, the BS commands transmission of a scheduling request signal in one or more channel regions by configuration information or other information.

An MS selects a scheduling request signal randomly or based on information such as its user ID in order to request scheduling and transmits the scheduling request signal in channel regions selected from among the N×M channel regions. Because the MS knows a best UL Tx beam, the MS does not need to use all Tx beams to transmit the scheduling request signal. Therefore, the MS transmits the scheduling request signal in one or more Tx beam regions selected from among Tx regions corresponding to each Rx beam, that is, in each Rx beam region 606 in which the MS transmits different Tx beams regarding Rx beam of the BS.

Specifically, the MS transmits the scheduling request signal in one or more Tx beam regions common to all of the Rx beam regions 606. That is, each Tx beam region is at the same resource position in the Rx beam regions 606. In this case, the BS can maximize the reception performance of the scheduling request signal by combining the scheduling request signals received over a plurality of Rx beams, as long as the scheduling request signal of the MS does not collide with a scheduling request signal of another MS.

In the example of FIG. 6, the MS transmits the scheduling request signal in a randomly selected Tx beam region, Tx beam region #3 in all Rx beam regions RX #1 to Rx #6. In an exemplary embodiment of the present invention, the MS can transmit the scheduling request signal by the best UL Tx beam in the selected Tx beam regions irrespective of Tx beams mapped to the selected Tx beam regions. For example, the MS uses the best UL Tx beam #1 selected during a beam selection procedure in transmitting the scheduling request signal in Tx beam region #3, instead of Tx beam #3 mapped to Tx beam region #3. In another exemplary embodiment of the present invention, when transmitting the scheduling request signal in a randomly selected Tx beam region, the MS can use a randomly selected Tx beam.

The BS monitors reception of scheduling request signals from MSs within the cell by sweeping Rx beams in all directions in the resource area 604. That is, the BS attempts to detect a scheduling request signal from an MS using a BS Rx beam corresponding to each channel region of the resource area 604. Upon successful detection of the scheduling request signal, the BS transmits to the MS information about the detected signal, information about a UL transmission beam corresponding to a resource position at which the signal has been detected (e.g. the index or beam index of a channel region), and other information needed as a response to the scheduling request.

In a modified embodiment of the present invention, the resource area 604 can be divided into a plurality of Tx beam regions, each including a plurality of contiguous Rx beam regions. An MS can transmit a scheduling request signal M times repeatedly in at least one Tx beam region randomly selected from among the plurality of Tx beam regions by a Tx beam corresponding to the at least one Tx beam region. The BS can attempt to receive the scheduling request signal by sequentially using M Rx beams in each Tx beam region.

Figure 7:
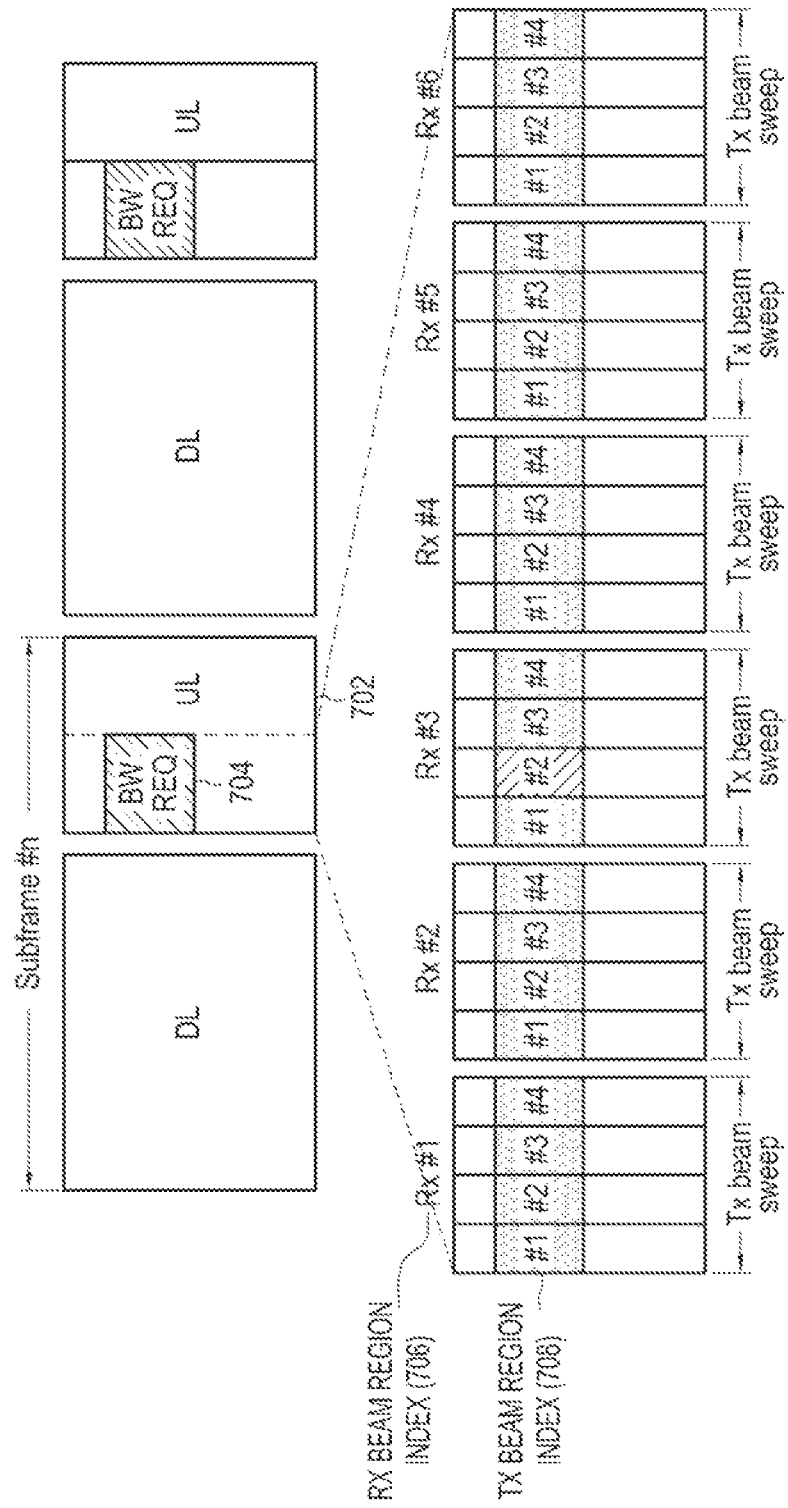
FIG. 7 illustrates the structure of a scheduling request channel according to another exemplary embodiment of the present invention.

FIG. 7 illustrates the structure of a scheduling request channel according to another exemplary embodiment of the present invention. The scheduling request channel has the configuration illustrated in FIG. 7 in the case where an MS has knowledge of both a best UL Tx beam and a best UL Rx beam.

Referring to FIG. 7, the scheduling request channel has a configuration similar to those illustrated in FIGS. 4, 5 and 6. The scheduling request channel is allocated to a specific resource area 704 in a UL region 702. The resource area 704 is divided into a plurality of channel regions (i.e. a plurality of Tx opportunities) mapped to MS Tx beams and BS Rx beams. N×M channel regions are mapped to N MS Tx beams and M BS Rx beams. Among the channel regions, channel regions mapped to one BS Rx beam are collectively referred to as an Rx beam region. Thus, first N channel regions form a first Rx beam region and the resource area 704 includes M Rx beam regions. Each Rx beam region includes N channel regions corresponding to N Tx beams, that is, N Tx beam regions.

A BS broadcasts configuration information describing the configuration of the resource area 704 to MSs within a cell. For example, the configuration information includes at least one of the time and frequency positions of the resource area 704, M and N values, available scheduling request signals (i.e. scheduling request sequences or BR sequences), and Tx and Rx parameters. The BS can further signal the number of channel regions in the scheduling request channel on which an MS will transmit a scheduling request signal. In other words, the BS commands transmission of a scheduling request signal in one or more channel regions by configuration information or other information.

An MS selects a scheduling request signal randomly or based on information such as its user ID in order to request scheduling and transmits the scheduling request signal in a channel region corresponding to the best UL Tx beam and the best UL Rx beam selected from among the N×M channel regions. Because the MS knows both the best UL Tx beam and the best UL Rx beam, the MS does not need to transmit the scheduling request signal repeatedly by all Tx beams. Therefore, the MS transmits the scheduling request signal in one specific Tx beam region selected from among Tx regions corresponding to one specific Rx beam, that is, in an Rx beam region 706 corresponding to the specific Rx beam.

Specifically, the MS transmits the scheduling request signal in one Tx beam region corresponding to the best UL Tx beam in one Rx beam region corresponding to the best UL Rx beam. In the example of FIG. 7, the best UL Tx beam for the MS is Tx beam #2 and the best UL Rx beam for the MS is Rx beam #3. Thus the MS transmits the scheduling request signal in Tx beam region #2 in Rx beam region RX #3. The MS transmits the scheduling request signal using the best UL Tx beam in the selected Tx beam region. In other words, the MS transmits the scheduling request signal by Tx beam #2 in Tx beam region #2.

If the BS indicates use of one or more channel regions for transmission of a scheduling request signal to the MS, the MS can transmit the scheduling request signal in one or more channel regions corresponding to one or more best Tx-Rx beam pairs.

In another exemplary embodiment of the present invention, the MS can transmit the scheduling request signal in one Tx beam region corresponding to a randomly selected UL Tx beam in an Rx beam region corresponding to the best UL Rx beam. Referring to FIG. 7, the best UL Tx beam is Tx beam #1 and the best UL Rx beam is Rx beam #3. The MS transmits the scheduling request signal in a randomly selected Tx beam region #2 in the Rx beam region #3 corresponding to the best UL Rx beam.

In another exemplary embodiment of the present invention, the MS can transmit the scheduling request signal in one Tx beam region corresponding to a randomly selected UL Tx beam in an Rx beam region corresponding to a randomly selected UL Rx beam. Referring to FIG. 7, the best UL Tx beam is Tx beam #1 and the best UL Rx beam is Rx beam #3. The MS transmits the scheduling request signal in a randomly selected Tx beam region #2 in the Rx beam region #3 corresponding to the best UL Rx beam.

The BS monitors reception of scheduling request signals from MSs within the cell by sweeping reception beams in all directions in the resource area 704. That is, the BS attempts to detect a scheduling request signal from an MS using a BS Rx beam corresponding to each channel region of the resource area 704. Upon successful detection of the scheduling request signal, the BS transmits to the MS information about the detected signal, information about a UL Tx beam corresponding to a resource position at which the signal has been detected (e.g. the index or beam index of a channel region), and other information needed as a response to the scheduling request.

Because the probabilities of collision between users are different in the structures of a scheduling request channel illustrated in FIGS. 4 to 7, different scheduling request signals can be set in FIGS. 4 to 7. Specifically, different signal sets of signals can be selected from among total available scheduling request signals for the scheduling request channel structures illustrated in FIGS. 4 to 7 and the BS can signal the different signal sets to the MSs within the cell by broadcasting configuration information. Each MS selects a scheduling request signal from the specific signal set depending on whether UL beam selection is completed and best UL Tx/Rx beam information is known.

While it has been described with reference to FIGS. 4 to 7 that each of the resource areas 408, 504, 604 and 704 is divided into a plurality of Rx beam regions and an MS sweeps all Tx beams in each Rx beam region, the opposite case is also possible.

Figure 8:
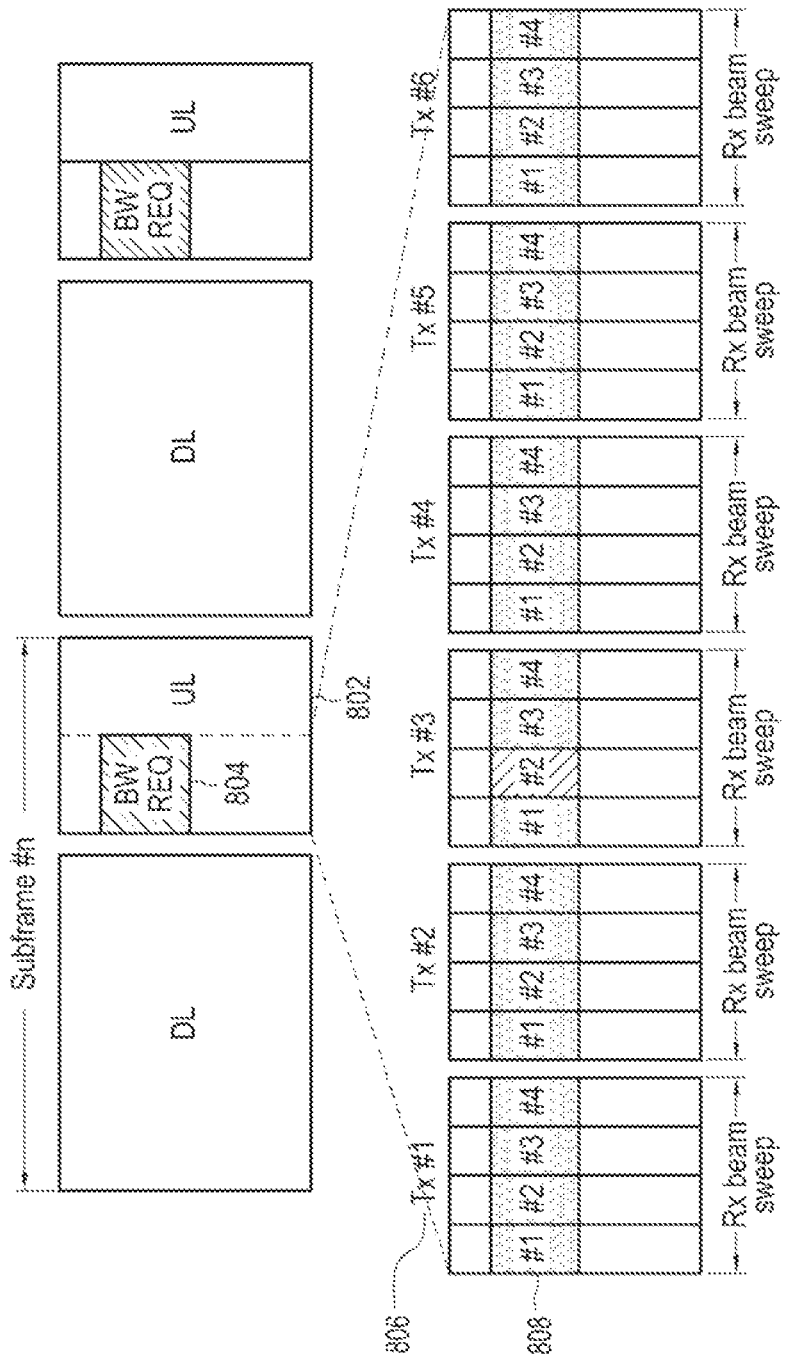
FIG. 8 illustrates the structure of a scheduling request channel according to another exemplary embodiment of the present invention.

FIG. 8 illustrates the structure of a scheduling request channel according to another exemplary embodiment of the present invention. The scheduling request channel has the configuration illustrated in FIG. 8 in the case where an MS has knowledge of a best UL Tx beam.

Referring to FIG. 8, the scheduling request channel is allocated to a specific resource area 804 in a UL region 802. The resource area 804 is divided into a plurality of channel regions (i.e. a plurality of Tx opportunities) mapped to MS Tx beams and BS Rx beams. M×N channel regions are mapped to M BS Rx beams and N MS Tx beams. Among the channel regions, channel regions mapped to one MS Tx beam are collectively referred to as Tx beam regions. Thus, first M channel regions form a first Tx beam region and the resource area 804 includes N Tx beam regions. Each Tx beam region includes M channel regions corresponding to M Rx beams, that is, M Rx beam regions.

A BS broadcasts configuration information describing the configuration of the resource area 804 of the scheduling request channel to MSs within a cell. For example, the configuration information includes at least one of the time and frequency positions of the scheduling request channel resource area 804, M and N values, available scheduling request signals (i.e. scheduling request sequences or BR sequences), and Tx and Rx parameters. The BS can further signal the number of channel regions in the scheduling request channel on which an MS will transmit a scheduling request signal. In other words, the BS commands transmission of a scheduling request signal in one or more channel regions by configuration information or other information.

An MS selects a scheduling request signal randomly or based on information such as its user ID in order to request scheduling and transmits the scheduling request signal in a Tx beam region selected randomly. The scheduling request signal is transmitted N times repeatedly in M Rx beam regions of the selected Tx beam region using one Tx beam, that is the best UL Tx beam of the MS. In an exemplary embodiment, the MS can transmit a scheduling request signal in a Tx beam region corresponding to the best UL Tx beam of the MS. In another exemplary embodiment, the MS can transmit a scheduling request signal in a Rx beam region corresponding to the best UL Rx beam, in a Tx beam region corresponding to the best UL Tx beam, in case that the MS knows both of the best UL Rx beam and the best UL Tx beam.

Specifically, the MS can transmit the scheduling request signal during one Rx beam region selected randomly or based on in one Tx beam region (i.e., the Tx beam region #2) corresponding to the best UL Tx beam. In an exemplary embodiment, the MS can transmit the scheduling request signal repeatedly during multiple (or all) Rx beam regions in one Tx beam region (i.e., the Tx beam region #2) corresponding to the best UL Tx beam. In another exemplary embodiment, the MS can transmit the scheduling request signal during one Rx beam region selected randomly in one Tx beam region (i.e., the Tx beam region #2) selected randomly.

The BS monitors reception of scheduling request signals from MSs within the cell by sweeping reception beams in all directions in the resource area 804. That is, the BS attempts to detect a scheduling request signal from an MS using a BS Rx beam corresponding to each channel region of the resource area 804. Upon successful detection of the scheduling request signal, the BS transmits to the MS information about the detected signal, information about a UL Tx beam corresponding to a resource position at which the signal has been detected (e.g. the index or beam index of a channel region), and other information needed as a response to the scheduling request.

In the example of FIG. 8, the MS has 6 of UL Tx beam transmit opportunities, and the number of DL Rx Beam sweeps of the BS is 4 for each UL Tx beam transmit opportunity. In one exemplary embodiment, regardless to the number of the Tx beam regions, the MS can use one Tx beam transmit opportunity. That is, if the MS does not know the best UL Tx beam, the MS transmits a scheduling request signal over a specific Tx beam in its Tx beam region, and then wait a response from the BS. If the MS does not receive the response from the BS, the MS transmits the scheduling request signal over another Tx beam in its Tx beam region. The operation can be performed repeatedly for N MS Tx beams.

In another exemplary embodiment, although the MS knows the best UL Tx beam, the MS can transmit a scheduling request signal again using other Tx beams when the MS does not receive the response to the scheduling request signal transmitted by using the best UL Tx beam.

In a real communication environment, at least two of the exemplary embodiments of the present invention illustrated in FIGS. 4 to 8 can be used in combination. In an exemplary embodiment, when the MS initially accesses the BS, the MS can request scheduling to the BS in the method of FIG. 4 or FIG. 5 and when resource allocation is needed during communication between the MS and the BS, the MS can request scheduling to the BS in the method of FIG. 6, FIG. 7 or FIG. 8. In another exemplary embodiment, without knowledge of a best Tx/Rx beam, the MS can use the method of FIG. 4 or FIG. 5 and after a best Tx/Rx beam is determined, the MS can use the method of FIG. 6, FIG. 7 or FIG. 8. In another exemplary embodiment of the present invention, the MS can request scheduling in one of the methods illustrated in FIGS. 4 to 8 according to a preset condition or a communication environment.

Figure 9:
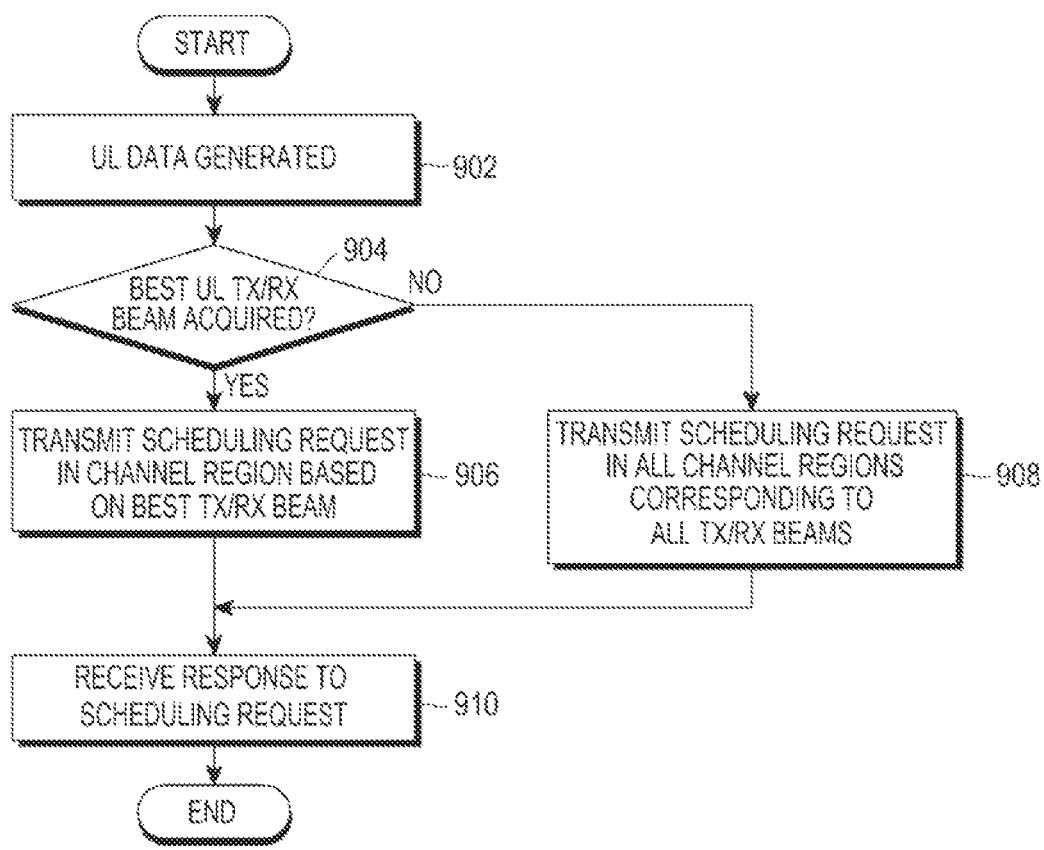
FIG. 9 is a flowchart illustrating an operation of transmitting a scheduling request in an MS according to another exemplary embodiment of the present invention.

FIG. 9 is a flowchart illustrating an operation of transmitting a scheduling request in an MS according to another exemplary embodiment of the present invention.

Referring to FIG. 9, upon generation of UL data to be transmitted to a BS in step 902, the MS determines whether it has information about a best UL Tx/Rx beam in step 904. Specifically, the MS determines whether UL beam tracking (i.e. UL beam selection) has been completed and information about a best UL Tx beam and/or a best UL Rx beam has been stored. If the MS has the information about the best UL Tx beam and/or the best UL Rx beam, the MS goes to step 906 and otherwise, the MS goes to step 908.

In step 906, the MS transmits a signal for requesting scheduling (i.e. a scheduling request sequence) in at least one channel region corresponding to the best UL Tx/Rx beam in a UL resource area allocated to a scheduling request channel. For example, the MS transmits the scheduling request signal in one or more channel regions selected from each Rx beam region in the resource area of the scheduling request channel according to the method illustrated in FIG. 5 or FIG. 6. The one or more channel regions can be selected randomly from each of a plurality of Rx beam regions or located at the same positions in the plurality of Rx beam regions. In an exemplary embodiment of the present invention, the MS selects a channel region according to the method of FIG. 5 or FIG. 6 based on configuration information received from the BS. The scheduling request signal is transmitted by the best UL Tx beam in the selected one or more channel regions. In another exemplary embodiment of the present invention, the MS transmits the scheduling request signal in one channel region corresponding to the best UL Tx beam and the best UL Rx beam according to the method of FIG. 7.

In step 910, the MS receives a response to the transmitted scheduling request signal from the BS. While not shown, if the MS does not receive the response within a predetermined time from the BS after the scheduling request signal is transmitted, the MS can return to step 904 or can end UL data transmission.

Figure 10:
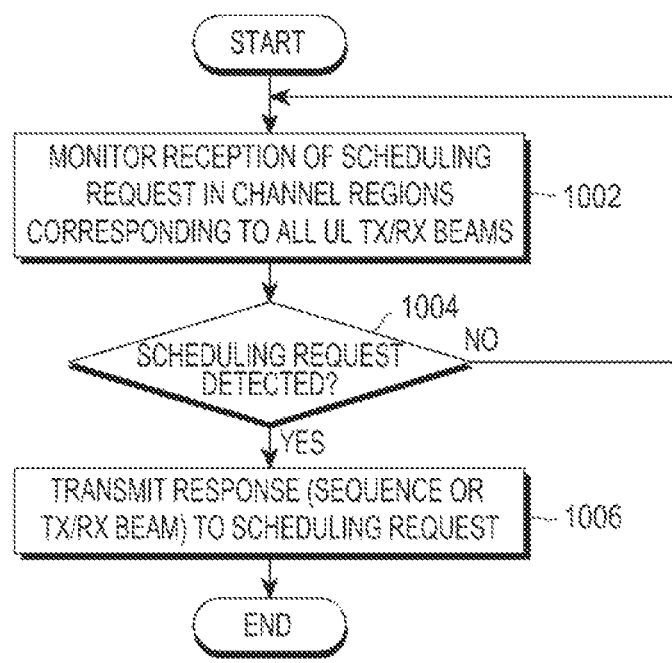
FIG. 10 is a flowchart illustrating an operation of receiving a scheduling request in a BS according to another exemplary embodiment of the present invention.

FIG. 10 is a flowchart illustrating an operation of receiving a scheduling request in a BS according to another exemplary embodiment of the present invention.

Referring to FIG. 10, the BS monitors reception of a scheduling request signal from one of MSs within a cell in all channel regions of a UL resource area allocated to a scheduling request channel in step 1002. Upon detection of a scheduling request signal in step 1004, the BS transmits a response to the scheduling request signal to the MS in step 1006.

Figure 11:
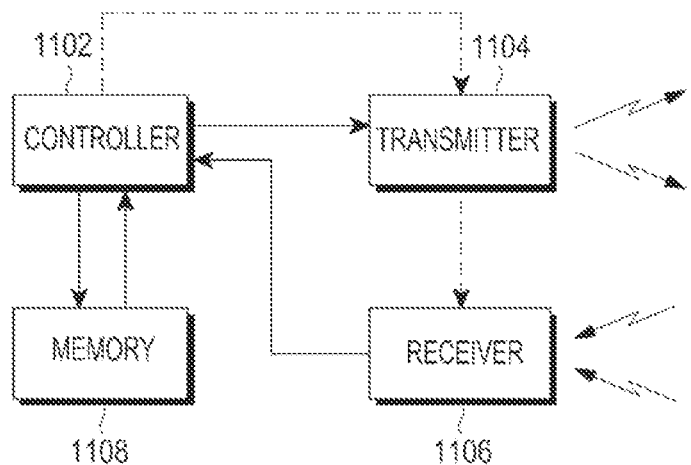
FIG. 11 is a block diagram of a BS and an MS that perform a scheduling request procedure according to an exemplary embodiment of the present invention.

FIG. 11 is a block diagram of a BS and an MS that perform a scheduling request procedure according to an exemplary embodiment of the present invention.

In the case that an MS is configured in the structure illustrated in FIG. 11, a controller 1102 performs UL beam selection by controlling a transmitter 1104 and a receiver 1106 and stores information about a best UL Tx beam and/or a best UL Rx beam selected during the UL beam selection in a memory 1108. Upon generation of UL data to be transmitted to a BS, the controller 1102 determines whether the information about the best UL Tx beam and/or the best UL Rx beam has been stored in the memory 1108. In the absence of the information about the best UL Tx beam and/or the best UL Rx beam in the memory 1108, the controller 1102 transmits a scheduling request signal in all channel regions corresponding to all UL Tx and Rx beams in a UL resource area allocated to a scheduling request channel by controlling the transmitter 1104. In the presence of the information about the best UL Tx beam and/or the best UL Rx beam in the memory 1108, the controller 1102 transmits the scheduling request signal in at least one channel region corresponding to the best UL Tx/Rx beam in the UL area allocated to the scheduling request channel by controlling the transmitter 1104.

The receiver 1106 provides configuration information about the scheduling request channel broadcast from the BS to the controller 1102. Upon receipt of a response to the transmitted scheduling request signal from the BS, the receiver 1106 transmits the response to the controller 1102 so that the controller 1102 can continue the UL data transmission request procedure.

In the case that a BS is configured in the structure illustrated in FIG. 11, the receiver 1106 monitors reception of a scheduling request signal from one of MSs within a cell in all channel regions of a UL resource area allocated to a scheduling request channel. Upon detection of a scheduling request signal, the receiver 1106 transmits the scheduling request signal to the controller 1102. The controller 1102 transmits a response to the scheduling request signal to the MS through the transmitter 1104. The memory 1108 can store a program code needed for operations of the controller 1102, information about best UL Tx/Rx beams of MSs within the cell, and information about MSs that transmit scheduling requests.

At this point it should be noted that the exemplary embodiments of the present disclosure as described above typically involve the processing of input data and the generation of output data to some extent. This input data processing and output data generation can be implemented in hardware or software in combination with hardware. For example, specific electronic components can be employed in a mobile device or similar or related circuitry for implementing the functions associated with the exemplary embodiments of the present invention as described above. Alternatively, one or more processors operating in accordance with stored instructions can implement the functions associated with the exemplary embodiments of the present invention as described above. If such is the case, it is within the scope of the present disclosure that such instructions can be stored on one or more processor readable mediums. Examples of the processor readable mediums include Read-Only Memory (ROM), Random-Access Memory (RAM), CD-ROMs, magnetic tapes, floppy disks, and optical data storage devices. The processor readable mediums can also be distributed over network coupled computer systems so that the instructions are stored and executed in a distributed fashion. Also, functional computer programs, instructions, and instruction segments for accomplishing the present invention can be easily construed by programmers skilled in the art to which the present invention pertains.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of communication by a mobile station (MS) using beamforming in a wireless communication system, the method comprising:
    receiving, from a base station, configuration information indicating mapping between a plurality of channel regions for a scheduling request channel and beam pairs of a plurality of uplink reception beams of the base station and a plurality of uplink transmission beams of the MS;
    determining whether the MS has knowledge of both an uplink first transmission beam and an uplink first reception beam, wherein the uplink first transmission beam is selected from the plurality of uplink transmission beams based on beam directivity and the uplink first reception beam is selected from the plurality of uplink reception beams based on the beam directivity;
    when the MS has knowledge of both the uplink first transmission beam and the uplink first reception beam, selecting channel region corresponding to the first uplink transmission beam and the first uplink reception beam based on the configuration information, transmitting a scheduling request signal for requesting an uplink resource allocation on the channel region to the BS by using the uplink first transmission beam; and
    when the MS does not have the knowledge of both the uplink first transmission beam and the uplink first reception beam, transmitting the scheduling request signal on the plurality of channel regions to the BS without performing an uplink beamforming.

2. The method of claim 1, wherein when the MS does not have the knowledge of both the uplink first transmission beam and the uplink first reception beam, the scheduling request signal is repeatedly transmitted on all channel regions corresponding to all uplink transmission beams in an uplink resource area.

3. The method of claim 1, wherein when the MS has knowledge of both the uplink first transmission beam and the uplink first reception beam, the scheduling request signal is transmitted using the uplink first transmission beam on at least one transmission beam region being randomly selected from at least one reception beam region corresponding to at least one uplink reception beam in an uplink resource area.

4. The method of claim 1, wherein when the MS has knowledge of both the uplink first transmission beam and the uplink first reception beam, the scheduling request signal is transmitted using the uplink first transmission beam on at least one transmission beam region among a plurality of transmission beam regions selected as a same time-frequency resource position within each of a plurality of uplink reception beam regions corresponding to the plurality of uplink reception beams in an uplink resource area.

5. The method of claim 1, wherein the configuration information comprises at least one of information about time and frequency position of an uplink resource area, information on a number of the uplink transmission beams and the uplink reception beams corresponding to channel regions in the uplink resource area, at least one set of available scheduling request signals, transmission and reception parameters, and information about a number of channel regions to carry the scheduling request signal.

6. A mobile station (MS) for performing communication using beamforming in a wireless communication system, the MS comprising:
- a transceiver configured to transmit or receive signal;
- a controller coupled with the transceiver and configured to:
    - control the transceiver to receive configuration information indicating mapping between a plurality of channel regions for a scheduling request channel and beam pairs of a plurality of uplink reception beams of a base station and a plurality of uplink transmission beams of the MS;
    - determine whether the MS has knowledge of both an uplink first transmission beam and an uplink first reception beam, wherein the uplink first transmission beam is selected from the plurality of uplink transmission beams based on beam directivity and the uplink first reception beam is selected from the plurality of uplink reception beams based on the beam directivity;
    - when the MS has knowledge of both the uplink first transmission beam and the uplink first reception beam, select channel region corresponding to the first uplink transmission beam and the first uplink reception beam based on the configuration information and control the transceiver to transmit a scheduling request signal for requesting an uplink resource allocation on the channel region to the BS; and
    - when the MS does not have the knowledge of both the uplink first transmission beam and the uplink first reception beam, control the transceiver to transmit the scheduling request signal on the plurality of channel regions to the BS without performing an uplink beamforming.

7. The MS of claim 6, wherein when the MS does not have the knowledge of both the uplink first transmission beam and the uplink first reception beam, the controller further configured to control the transceiver to repeatedly transmit the scheduling request signal on all channel regions corresponding to all uplink transmission beams in an uplink resource area.

8. The MS of claim 6, wherein when the MS has knowledge of both the uplink first transmission beam and the uplink first reception beam, the controller further configured to control the transceiver to transmit the scheduling request signal using the uplink first transmission beam on at least one transmission beam region being randomly selected from at least one reception beam regions corresponding to at least one uplink reception beam in an uplink resource area.

9. The MS of claim 6, wherein when the MS has knowledge of both the uplink first transmission beam and the uplink first reception beam, the controller further configured to control the transceiver to transmit the scheduling request signal using the uplink first transmission beam on at least one transmission beam region among a plurality of transmission beam regions selected at the same time-frequency resource position within each of a plurality of uplink reception beam regions allocated corresponding to at least one uplink reception beam in an uplink resource area.

10. The MS of claim 6, wherein the configuration information comprises at least one of information on time and frequency position of an uplink resource area, information on a number of the uplink transmission beams and the uplink reception beams corresponding to channel regions in the uplink resource area, at least one set of available scheduling request signals, transmission and reception parameters, and information on a number of channel regions to carry the scheduling request signal.

* * * * *